UNITED STATES PATENT OFFICE.

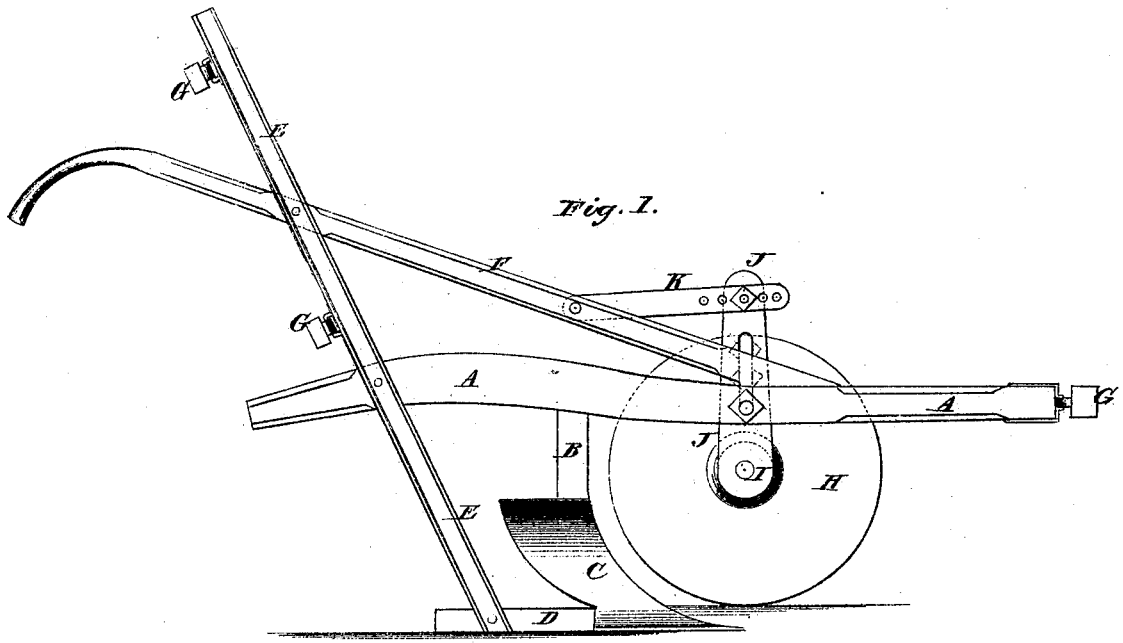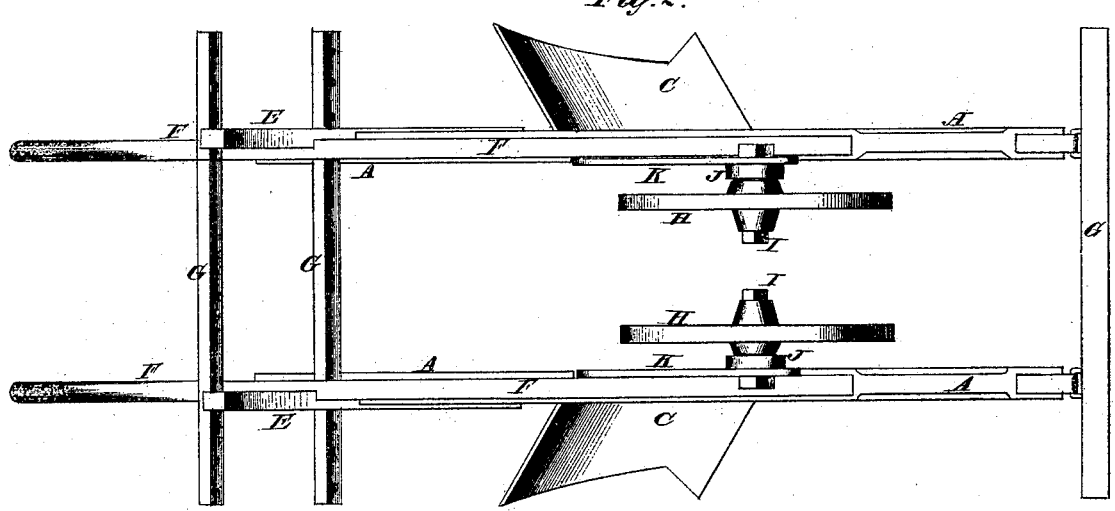

ALEXANDER B. THORNTON, OF NEW BERLIN, ILLINOIS.

IMPROVEMENT IN COMBINED FENDERS AND GAGE-WHEELS.

Specification forming part of Letters Patent No. 111,790, dated February 14, 1871; antedated February 11, 1871.

*To all whom it may concern:*

Be it known that I, ALEXANDER B. THORNTON, of New Berlin, in the county of Sangamon and State of Illinois, have invented a new and useful Improvement in Combined Fender and Gage-Wheel; and I do hereby declare that the following is a full, clear, and exact description thereof, which will enable others skilled in the art to make and use the same, reference being had to the accompanying drawings, forming part of this specification, in which—

Figure 1 is a side view of a cultivator-plow to which my improvement has been attached. Fig. 2 is a top view of the same.

Similar letters of reference indicate corresponding parts.

My invention has for its object to furnish an improved fender for protecting the plants from being covered and injured by having too much dirt thrown around or over them, and which shall, at the same time, be so constructed as to serve as a gage-wheel, to regulate the depth at which the plow works in the ground.

The invention consists in the arrangement of the fenders or gage-wheels so as to be adjustable vertically, and also nearer to or farther from the plows, as hereinafter described.

A are the plow-beams.
B are the standards.
C are the plows.
D are the landsides.
E are uprights, the lower ends of which are bolted to the rear parts of the landsides D.

The uprights E are bolted to the rear ends of the beams A, and to their upper parts are secured the handles F, the forward ends of which are attached to the beams A. The two plows are adjustably connected to each other by the cross-bars G, which are connected to the uprights E and forward ends of the beams A by eyebolts, staples, or other flexible connections.

H are wheels, which are made with hubs, and revolve upon axles I, formed upon or attached to the lower ends of the standards J, which are secured to the beams A by bolts which pass through slots in the said standards J, the heads of the said bolts entering angular recesses formed in the sides of the said standards along the edges of the said slots, as shown in Fig. 1.

K are brace-bars, the rear ends of which are bolted to the handles F, and the forward ends of which are secured to the upper ends of the standards J by bolts which pass through holes in the upper ends of the said standards and through one or the other of the holes through the forward parts of the said braces. This construction enables the wheels, fenders, or shields H to be adjusted nearer to or farther from the plows C, according as it is desired to have more or less dirt pass to and around the plants. It also enables the said wheels H to be raised and lowered to adjust the plows to work deeper or shallower in the ground, as may be desired. Another advantage of this arrangement of the wheels H is that they roll along the surface of the ground upon the landside of the plows, and thus prevent the soil from being broken up around the roots of the plants, enabling the plows to work closer to the plants than they otherwise could.

Having thus described my invention, I claim as new and desire to secure by Letters Patent—

The arrangement with reference to the beams A and plows C of the fenders H, slotted standards J, and adjustable brace-bars K, all constructed as and for the purpose specified.

ALEXANDER B. THORNTON.

Witnesses:
R. H. PRICE,
D. MARLOW.